United States Patent [19]
Habermehl

[11] Patent Number: 5,337,635
[45] Date of Patent: Aug. 16, 1994

[54] SCREWDRIVING APPARATUS FOR USE IN DRIVING SCREWS JOINED TOGETHER IN A STRIP

[76] Inventor: G. Lyle Habermehl, 7528 Hickory Hills Ct., Whites Creek, Tenn. 37189

[21] Appl. No.: 18,897

[22] Filed: Feb. 17, 1993

[51] Int. Cl.$^5$ ............................................. B25B 23/06
[52] U.S. Cl. ..................................... 81/434; 227/136
[58] Field of Search ................. 81/57.37, 434; 227/136

[56] References Cited
U.S. PATENT DOCUMENTS 4,018,254 4/1977 DeCaro .......................... 227/136 X
4,146,071 3/1979 Mueller et al. .
4,625,597 12/1986 Cast ................................... 81/57.37

OTHER PUBLICATIONS

Quik Drive "Screwdrivers Attachment" for Model Nos. 3301 and 3303, Feb. 1992.

*Primary Examiner*—James G. Smith
*Attorney, Agent, or Firm*—Dorsey & Whitney

[57] ABSTRACT

A driver for fasteners, and particularly, a power screwdriver is described which is adapted to drive screws having different diameters. The power screwdriver has a removable guide tube and a complementary drive shaft. The guide tube is sized to the diameter of one size of screw. The complementary removable drive shaft is sized to be guided in the guide shaft, reciprocally movable therein to engage and guide a screw located in the guide tube. By removal of one pair of guide tube and complementary drive shaft and replacement with another pair of guide tube and complementary drive shaft adapted for use with screws having a different head diameter, the driver is adapted for driving screws of different head diameters.

15 Claims, 4 Drawing Sheets

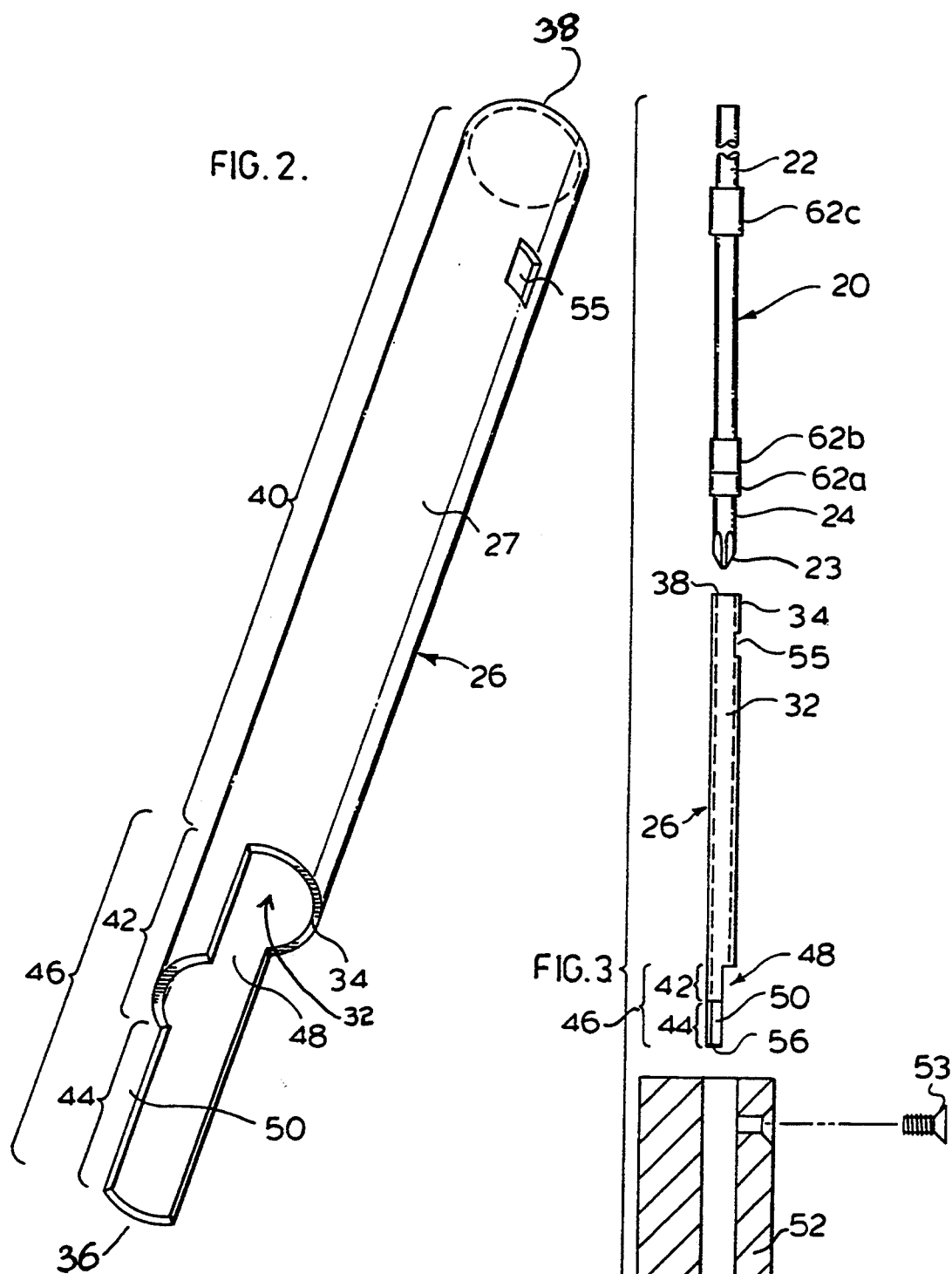

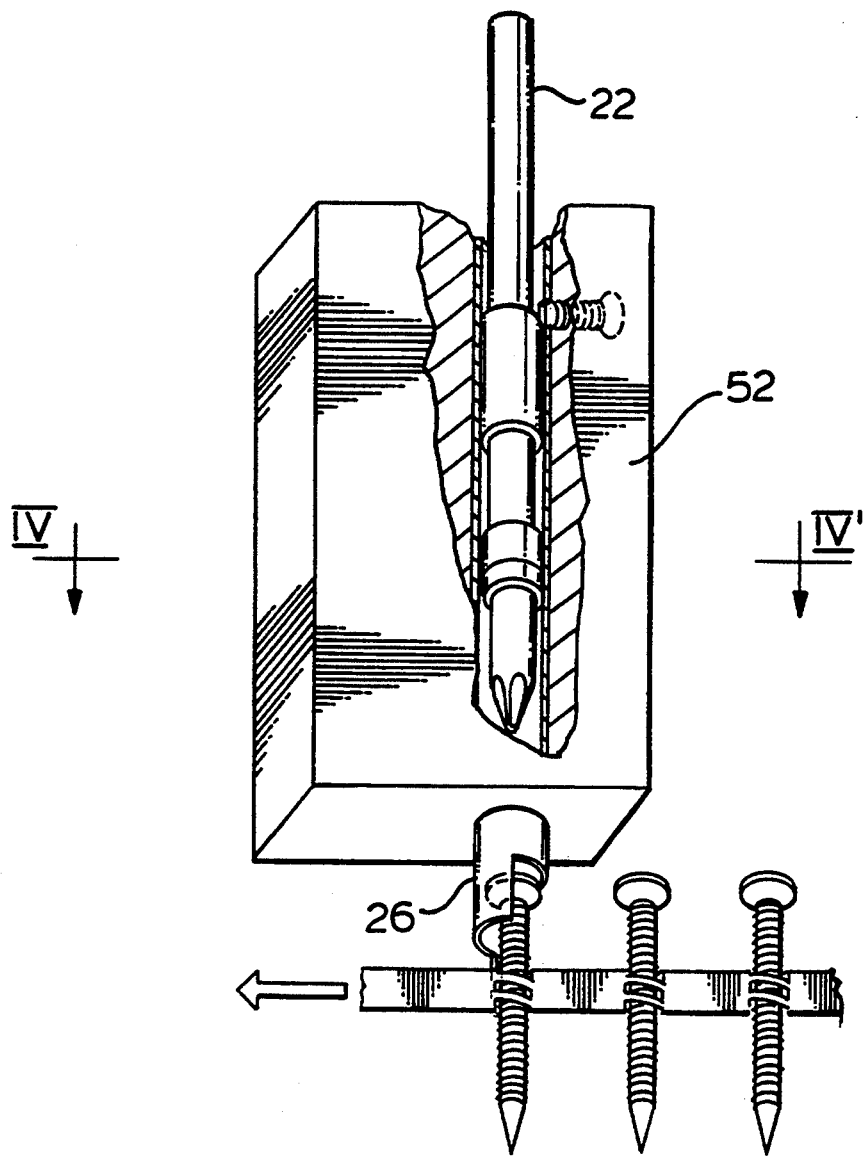

SCREWDRIVING APPARATUS FOR USE IN DRIVING SCREWS JOINED TOGETHER IN A STRIP

SCOPE OF THE INVENTION

This invention relates generally to a screwdriver adapted for driving screws which are joined together in a strip and, more particularly, a power screwdriver which is adaptable for use in driving a number of screws having different lengths and diameter screw heads.

BACKGROUND OF THE INVENTION

Power screwdrivers for use in successively driving screws which are collated, secured in a parallel spaced relation with a belt or plastic strip of material are known. One such power screwdriving apparatus is described in U.S. Pat. No. 4,146,071 to Mueller et al, issued Mar. 27, 1979, the disclosure of which is incorporated herein by reference. Such known power screwdrivers include a rotatable and reciprocally moving screwdriver shaft, which is turned in rotation by an electric motor. A screwdriving bit held in an end-most portion of the shaft, defines a tip for engaging the head of each successive screw as it is moved into a driving position, axially aligned under the screwdriving shaft.

In the driving position, a cup-shaped screw locating member is provided to support a peripheral edge of the screw head. The screw locating member typically defines a radial extent of a boreway through which the shaft and screw head axially move as the screw is driven. The boreway preferably having a diameter marginally larger than the outside radial diameter of the head of the screw.

The shaft is axially movable in the boreway in a reciprocal manner to engage the screw and drive it into a work-piece. After each screw is driven the shaft retracts and a subsequent screw carried on the strip is advanced sideways into the boreway, engaging the locating member so as to be axial aligned under the shaft. The shaft typically has a diameter equal to or slightly smaller than the diameter of the screw head so as to not adversely wear against the locating member as each screw is driven.

Known power screwdrivers suffer the disadvantage in that the locating member is often fixed relative to the shaft, making that it impractical to use the screwdriver with screws having different diameter screw heads. For example, on insertion of a screw having a head diameter appreciably larger than the diameter of the boreway, the screw abuts the locating member in a position out of axial alignment with the shaft and driving bit. Similarly, the use of screws having a head diameter appreciably smaller than the diameter of the axial boreway also results in the screw abutting the screw locating member at a position out of axial alignment with the shaft and driving bit. In either case, the tip will not properly engage the head of the screw resulting in premature tip wear, or causing the screw to deflect out of the correct axial orientation necessary to be driven.

To adapt the power screwdrivers for accommodating various sized screw heads, the screw locating member could be made movable radially inwardly and outwardly relative the boreway. In addition to adding to the cost of production, providing a movable locating member is disadvantageous in that the cup-shape of the locating member is fixed and is selected to engage the peripheral surface of only one diameter screw head. Accordingly, screws having screw heads which are either too small or too large may not be provided with adequate support by the locating member. Additionally, use of a movable locating member in accommodating screws having smaller head diameters, may result in a shaft and/or bit designed for use in driving screws having a larger head diameter, to disadvantageously wear against the locating member.

SUMMARY OF THE INVENTION

To overcome the disadvantages of the prior art, the present invention provides a screwdriver for driving screws, wherein in a driving position each screw is held in axial alignment with a screwdriving bit by abutting contact with a locating member. The locating member is removable from the screwdriver for replacement by another locating member configured to abuttingly contact and hold in axial alignment with the bit, a second screw having a different diameter screw head.

An object of the present invention is to provide a screwdriver for driving screws having differing diameter screw heads, wherein the screwdriver may be quickly and inexpensively customized for optimal placement and driving of various screws having a particular length or screw head diameter.

Another object of the present invention, is to provide an improved screwdriver, wherein the screwdriving bit may be made larger or smaller, corresponding with an increase or decrease in the diameter of the screw head, so as to reduce disadvantageous wear against the locating member.

A further object, is to provide a power screwdriver adaptable for driving screws having different sized screw heads or lengths, wherein the screws are collated together in a parallel spaced orientation within a retaining strip.

A further object is to provide a device for driving fasteners generally including both nails and screws which includes removable pairs of drivers and respective complementary fastener locating and driver guiding members, with each pair adapted for use in driving a fastener of a selected diameter different than the diameter of fasteners of other pairs.

A screwdriver in accordance with one embodiment of the present invention includes a rotatable bit for engaging and rotating the head of a screw which is to be driven. A screw locating member is provided to abuttingly contact a peripheral surface of the screw and assist in maintaining the screw in a proper driving position, axially aligned with the bit.

The locating member includes therethrough a guideway forming bore which is defined by a sidewall. A screwdriving bit is rotatably received within the guideway and is reciprocally movable to engage and drive each screw which is positioned co-axially aligned therewith. An access opening is provided in a portion of the sidewall sized to permit the movement of the screw head into the guideway. Once moved into the guideway, the screw is positioned in co-axial relation with the bit by the engagement of a portion of the screw with part of the sidewall. The locating member is removable from the screwdriver for replacement by another replacement locating member, having as a guideway, a different sized bore defined by a sidewall. The replacement locating member is configured to engage a portion of a screw having a different diameter screw head and-/or to have an access opening configured to permit a screw having a different length to move into the guideway.

Preferably, the locating member comprises a guide tube with the bore therethrough defining a cylindrical guideway. The guideway defines a radial extent of an axial boreway in which the screw is driven. Such an axial boreway is generally meant to include the space between the workpiece and the driving bit, which is occupied by the screw as it is driven into the workpiece. The diameter of the boreway preferably is only marginally larger than the outermost diameter of the screw to be driven, so that screws advanced into the guideway are maintained in co-axial alignment with the bit by the abutment of a radial outermost portion of the screw head with a portion of the sidewall. The guide tube is removable from the screwdriver for replacement by another guide tube which defines a radial extent of an axial boreway having a diameter which is marginally greater than the diameter of a different sized screw head.

Replacing the guide tube advantageously permits the selection of an axial boreway having a diameter which is complimentary to the diameter of the screw head which is to be driven. In this manner the screw locating member may be customized to abuttingly engage any size of screw head which is selected, ensuring proper screw alignment in the driving position and minimizing the likelihood that the screw will deflect from the correct axial orientation as it is driven.

Preferably, the bit is removable with the guide tube for replacement by another bit sized for complimentary rotary engagement in the guideway of the replacement guide tube. In this manner bits may be paired with the guide tube to minimize adverse wear of the bit against the sidewall.

More preferably the screwdriver of the present invention is a power screwdriver used to drive successively advanced screws which have been collated together in a strip. The screwdriver including a slide body having a bore formed therethrough in which the guide tube is removably housed. One end of the guide tube is cut away to form the screw access opening having a radial extent of at least about 180° C. An exit opening is provided in a portion of the guide tube radially opposite a portion of the screw access opening. The exit opening size is selected to permit substantially unhindered movement of the screw retaining strip outwardly from the guideway as each screw is advanced.

The screw driving bit is preferably removably attached to the end of an elongate cylindrical mandrel with the bit and mandrel defining a screwdriving shaft which is driven in rotation by an electric motor. The shaft having at least one cylindrically shaped locating section for rotatably engaging the guide tube sidewall to assist in maintaining the shaft in coaxial orientation with the guide tube in the guideway. Preferably, in a portion of the guide tube, the sidewall encircles and co-axially locates at least one locating section shaft at all times as the screw is driven.

Accordingly, in one aspect, the present invention resides in a screwdriver assembly to drive screws collated together in a strip spaced in parallel relation from each other, the screwdriver comprising body means, guide tube means removably fixedly secured to the body means, the guide tube means adapted to receive first correspondingly sized screws having a head with a first diameter, the guide tube means having a cylindrical guideway therethrough of an inner diameter marginally greater than the first diameter, and a cylindrical sidewall about the guideway, elongate driver shaft means having at a forward end bit means and including a cylindrical locating section, the shaft means complimentarily sized to the guide tube means by having a diameter of the cylindrical locating section approximately equal the first diameter, the shaft means co-axially disposed within the guideway for relative rotation therein and for axial reciprocal sliding relative to the guideway, the sidewall having a rear shaft guiding portion and a forward screw locating portion, in the rear portion, the sidewall sufficiently encircling the locating section of the shaft means to co-axially locate the shaft means within the guideway, in the forward portion, the sidewall opening radially into a screw access opening having a radial extent of at least about 180°, screw feed means to successively, incrementally advance screws collated in a strip spaced in parallel relation from each other through the screw access opening radially into the guideway wherein the sidewall engages the head of the correspondingly sized screw to axially locate the head of the screw co-axially within the guideway in axial alignment with the bit means, the shaft means reciprocally movable axially throughout the length of the guideway to engage the screw and drive it axially from the guideway into a work-piece, the complimentarily sized guide tube means and shaft means being removable for replacement with other complimentarily sized guide tube means and shaft means adapted for engaging and driving in the same manner correspondingly sized screws of a second diameter different than the first diameter.

In another embodiment, the invention provides an improved power nail driver, preferably, a pneumatic nail driver to drive nails. The nail driver includes a body with a bore in which a guide tube is removably secured. A complementary removable nail driving blade is reciprocally axially slidable in the guide tube guided therein for driving nails located and guided within the guide tube. By providing the guide tube and its complementary nail driving blade to be replaceable, the nail driver is adapted to drive nails of different nail head diameters. Separate systems can be used to adjust for different lengths of the nails. Accordingly, in another aspect the present invention provides a driver assembly to drive elongate fasteners having an enlarged head, the driver comprising:

body means, guide tube means removably fixedly secured to the body means, the guide tube means adapted to receive first correspondingly sized fasteners having a head with a first diameter, the guide tube means having a cylindrical guideway therethrough of an inner diameter marginally greater than the first diameter, and a cylindrical sidewall about the guideway, elongate driver shaft means having at a forward end fastener engaging means and including a cylindrical locating section, the shaft means complimentarily sized to the guide tube means by having a diameter of the cylindrical locating section approximately equal the first diameter, the shaft means co-axially disposed within the guideway for axial reciprocal sliding relative to the guideway, the sidewall having a rear shaft guiding portion and a forward fastener locating portion, in the rear portion, the sidewall sufficiently encircling the locating section of the shaft means to co-axially locate the shaft means within the guideway, fastener feed means to successively, incrementally advance fasteners into the guideway wherein the sidewall engages the head of the correspondingly sized fastener to axially locate the head of the fastener co-axially within the guideway in axial alignment with the fastener engaging means, the shaft means reciprocally movable axially throughout the length of the guideway to engage the fastener and drive it axially from the guideway into a work-piece, the complimentarily sized guide tube means and shaft means being removable for replacement with other complimentarily sized guide tube means and shaft means adapted for engaging and driving in the same manner correspondingly sized fasteners of a second diameter different than the first diameter.

BRIEF DESCRIPTION OF THE DRAWINGS

Further aspects and advantages of the present invention will appear from the following description taken together with the accompanying drawings in which:

FIG. 2 shows a perspective view of the guide tube of FIG. 1;

FIG. 3 shows an exploded partial cross-sectional side view of the slide body, guide tube and screwdriving shaft of FIG. 1;

FIG. 4 shows a partially cut away view of the slide body, guide tube and screwdriving shaft of FIG. 3 in an assembled configuration;

DETAILED DESCRIPTION OF THE DRAWINGS

Figure 1:
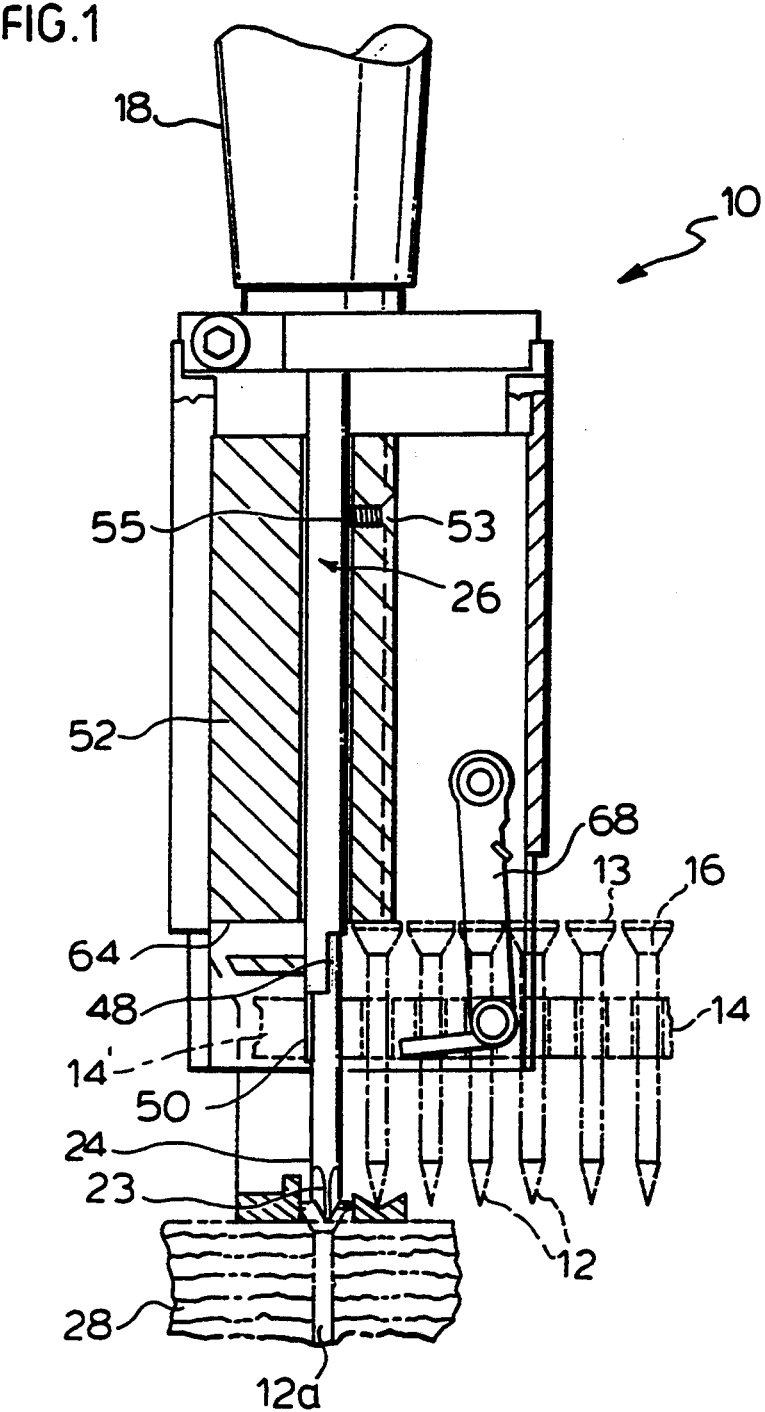
FIG. 1 is a schematic view of a power screwdriver in accordance with U.S. Pat. No. 4,146,071, modified to incorporate a guide tube in accordance with a preferred embodiment of the invention.

Reference is made first to FIG. 1, which shows in part an electrically powered screwdriver 10 of the type disclosed in U.S. Pat. No. 4,146,071. The screwdriver 10 is used in driving screws 12 which have been collated and secured together in a parallel spaced relationship by a plastic retaining strip 14. Such strips 14 are taught in U.S. Pat. No. 4,167,229.

The screwdriver 10 includes a chuck 18 which is rotated by an electric motor (not shown). The chuck 18 engages an end of an elongate metal shaft 20 best seen in FIG. 3 consisting of a generally cylindrical metal mandrel 22 having removably secured to a lower-most end thereof, an axially aligned metal bit 24. The bit 24 defines at a forward-most end a screwdriving tip 23, adapted for engaging a complementary shaped recess 13 formed in the head 16 of the screw 12. In a manner described in greater detail hereafter, while rotating, the mandrel 22 carrying the bit 24 is reciprocated within a metal guide tube 26 to engage and drive successive screws 12 into a work-piece 28. The guide tube 26 is secured in slide body 52. The screwdriver 10 of the present invention in essence has identical elements and operates to drive screws in an identical manner to that disclosed in U.S. Pat. No. 4,146,071.

The present invention is focused on the guide tube 26. FIG. 2, best shows guide tube 26 as having a generally cylindrical outer surface 27. A cylindrical bore or guideway 32 extends axially through the center of the guide tube 26, with the guideway 32 delineated and bordered by a radial extending cylindrical sidewall 34, and open at its forward axial end 36 and its rearward axial end 38.

The guide tube 26 is indicated as having a rearward portion 40 adjacent the rearward axial end 38 and a forward portion 46 adjacent the forward axial end 36. In rearward portion 40 of the guide tube 26, the sidewall 34 preferably extends 360°. Seen best in FIG. 3, the forward portion 46 is shown as having an engagement section 42 and a forward most section 44.

The forward portion 46 has substantially throughout its length an access opening 48, shown in the drawings as being on the right hand side of the guide tube 26. This access opening 48 extends to the forward axial end 36 of the guide tube 26. The screw access opening 48 is sized to permit the strip 14 carrying a screw 12 to move radially inwardly into the guideway 32 from the right as seen in the Figures. The screw access opening 48 preferably has a radial extent of not less than about 180° and more preferably about 180°.

The engagement section 42 of the forward portion 46 is a section into which the head of a screw 12 is moved when the strip 14 and screw 12 are advanced. In the engagement section 42, the wall 34 of the guide tube 26 engages the radially outermost periphery of the head 16 of the screw 12, to axially locate the screw head 16 coaxially within the guideway 32 in axial alignment with the bit 24. In this regard, in the engagement section 42 the walls 34 preferably extend about 180°. The forward most (or exit) section 44 of the forward portion 46 has not only the access opening 48, but also, on the side radially opposite the screw access opening 48, an exit opening 50. The exit opening 50, shown towards the left hand side of the guide tube 26 in the Figures, is provided of a size to permit the spent plastic strip 14' from which screws 12 have been driven to exit from the guideway 32. The sidewall 34 of the guide tube 26 is shown as extending only about 90° about the axis of the tube 26 in the forward most section 44 so as to accommodate the screw access opening 48 and the exit opening 50, and yet continue to provide a sidewall 34 which can assist in guiding the head 16 of the screw 12.

FIG. 3 shows best the insertion of the guide tube 26 into a slide body 52, which acts to support the guide tube 26. The slide body 52 may preferably be made of plastic as by injection molding. The guide tube 26 is removably secured within a cylindrical bore 54 which extends through the slide body 52. When the guide tube 26 is fully inserted and secured in the bore 54, the forward portion 46 extends beyond a front surface 64 of the slide body 52 a sufficient distance such that the screws 12 are aligned with screw access opening 48 and retaining strip 14 is aligned with exit opening 50. As seen best in FIG. 5, the bore 54 is preferably selected having a diameter D slightly larger than the external diameter D' of the guide tube 26. The guide tube 26 is shown as secured against axial sliding or rotation in the bore 54 by a set screw 53 which extends into a notch 55 in guide tube 26.

The shaft 20 is adapted for sliding insertion into e cylindrical guideway 32 via the rearward axial end 38.

Figure 5:
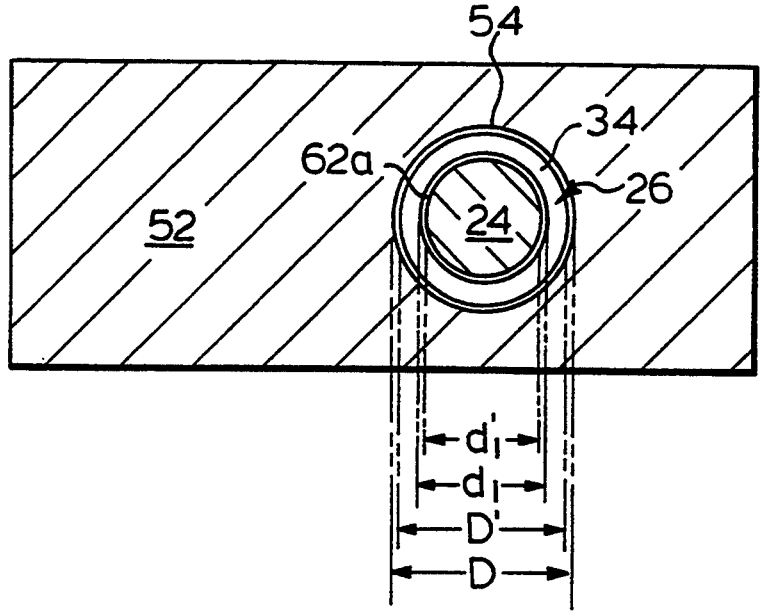
FIG. 5 shows an enlarged cross-sectional view of the slide body, guide tube and shaft of FIG. 4 taken along lines IV–IV'.

As seen in FIGS. 3 and 5, each of the mandrel 22 and bit 24 include cylindrical portions 62a, 62b, 62c, having an increased diameter $d'_1$ relative to the remainder of the shaft 20. The diameter $d'_1$ of the cylindrical portions is selected marginally smaller than the diameter $d_1$ of the guideway 32. On insertion of the shaft 20 into the guideway 32, the cylindrical portions 62a, 62b, 62c act as locating portions, engaging the side wall 34 to assist in maintaining the shaft 20 co-axial aligned with the guide tube 26. As is to be appreciated, while the shaft 20 in FIG. 3 shows three locating cylindrical portions 62a, 62b, 62c on both the mandrel 22 and bit 24, the locating portions are not limited to the configuration shown, and other configurations and/or numbers of locating portions may equally be used.

FIGS. 4 and 5 show best the guide tube 26, slide body 52 and mandrel 22 and bit 24 in the fully assembled configuration. With the guide tube 26 and bore 54 substantially axially aligned, the guide tube 26 is inserted into the slide body 52. Once the guide tube 26 is inserted, it is held in the slide body 52 against removal under normal screwdriving operations by the set screw 53.

With the guide tube 26 secured in the slide body 52, the mandrel 22 and bit 24 are axially aligned with the guide tube 26 and inserted in the cylindrical guideway 32. With the internal diameter $d_1$ of the guide tube 26 selected marginally larger than the diameter $d'_1$ of cylindrical locating portions 62a, 62b, 62c of the mandrel 22 and bit 24, the cylindrical portions 62a, 62b, 62c engage the side wall 34 to maintain the shaft 20 substantially co-axially aligned in the guide tube 26. Preferably the maximum diameter $d'_1$ of the cylindrical portions 62a, 62b, 62c, is selected approximately equal the diameter of the screw head 16. Providing a mandrel 22 and bit 24 having a maximum diameter $d'_1$ slightly less than the diameter $d_1$ of the cylindrical guideway 32 and screw head 16 advantageously reduces wearing contact by the shaft 20 against the guide tube 26.

As best seen in FIG. 1, the screws 12 to be driven are collated to be held parallel and spaced from each other by a plastic retaining strip 14. In use of the strip 14 in the screwdriver 10, in order for each successive screw 12 to be engaged and driven into the work-piece 28, each screw 12a is first advanced into axial alignment with the mandrel 22 and bit 24 by screw feed mechanism 68. The screw feed mechanism 68 engages and advances the plastic strip 14 as the bit 24 and mandrel 22 are moved in the return stroke away from the work-piece 28, under the force of a spring 66. On engagement of the plastic strip 14 by the screw feed mechanism 68, the screws 12 are moved radially into the guideway 32, through the screw access opening 48. The advanced screw 12a is held in position in axial alignment with the shaft 20 and bit 22 with the screw head 16 abutting the side wall 34 in the engagement section 42 of the guideway. As the screw 12a is moved into the cylindrical guideway 32, the leading portion of the strip 14' from which screws have previously been driven extends outwardly from the guideway 32 through the exit opening 50 in the forward most section 44, permitting substantially unhindered advance of the screws 12 and strip 14.

The cylindrical guideway 32 has a diameter which is selected so that the portion of the side wall 34 which defines the screw access opening 48, engages and supports an outer-most circumferential surface of the screw head 16.

Figure 6:
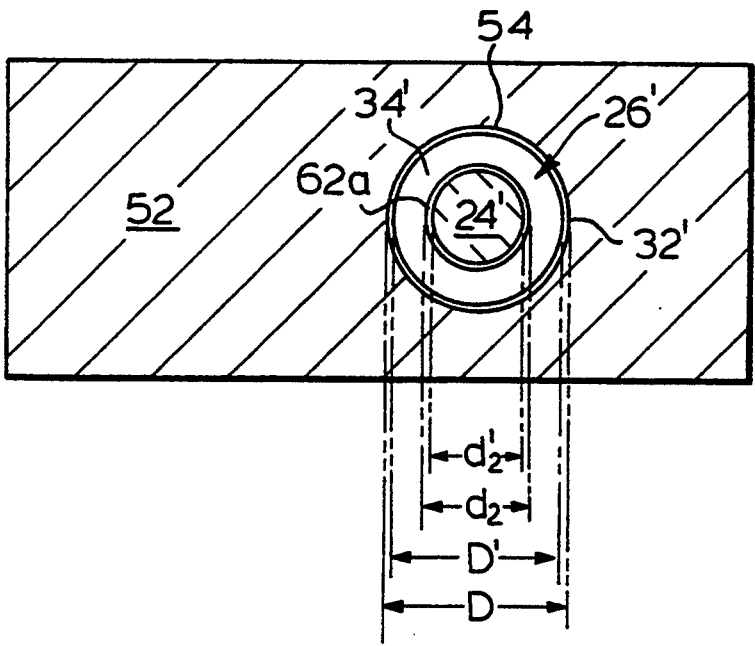
FIG. 6 shows an enlarged cross-sectional view of the slide body of FIG. 5 with a replacement guide tube and screwdriving shaft inserted.

To drive a second strip 14 of screws 12 having a smaller or larger diameter screw head 16, the guide tube 26, mandrel 22 and bit 24 are removed and replaced by another guide tube 26', shown in cross section in FIG. 6. Guide tube 26' is similar to guide tube 26, in having an outer diameter D' sized to fit within the bore 54, however, the guideway 32' is sized to engage and support a different diameter screw head. FIG. 6 shows a guide tube 26' for use in driving screws 12 having smaller diameter screw heads 16. The guide tube 26' is essentially the same as the guide tube 26 shown in FIG. 5, with the exception that the diameter $d_2$ of the guideway 32 is made smaller, by the provision of a thicker sidewall 34', such that guideway 32' is only marginally larger than the diameter of the smaller screw head 16.

The mandrel 22' and bit 24' for use in guide tube 26' are similarly identical to those shown in FIG. 5, with the exception of having a reduced maximum diameter $d'_2$, selected for complementary rotary engagement with the sidewall 34'.

As is to be appreciated, providing a guide tube 26 and mandrel 22 and bit 24 which are removable, permits the use of the screwdriver 10 with screws 12 having different diameter screw heads 16. In this manner, it may be ensured that whatever sized screw 12 is used, the screw 12 is always held in axial alignment with the shaft 20 by an optimally sized guide tube 26.

In operation, with the guide tube 26 inserted into slide body 54, a bit 24 having the desired screwdriving tip 23 is inserted into the mandrel 22 and the bit 24 and mandrel 22 are inserted into the guideway 32 as previously described. A number of screws 12 collated by plastic retaining strip 14 are inserted into the screwdriver 10. To drive screw 12a into work-piece 28, the motor (not shown) is activated to rotate the shaft 20. The mandrel 22 and bit 24, while they are rotated, are reciprocally movable in the guide way 32 towards and away from the work-piece 28. Manual pressure of the user, pushes the mandrel 22 and bit 24 towards the work-piece 28 against the bias of a spring (not shown). The compressed spring returns the mandrel 22 and bit 24 by moving them back from the work-piece 28 on a return stroke.

As the shaft 20 is axially moved towards the work-piece 28, the driving tip 23 engages the screw head 16 to turn the screw 12a in rotation. As is known, the plastic strip 14 is formed to release the screw 12a as it is first turned in rotation by the bit 24. Preferably, on release of the screw 12a, the plastic strip 14 deflects away from the screw 12a outwardly through the exit opening 50, so as not to interfere with the screw 12a orientation or its movement into the work-piece 28. After the screw 12a is driven into the work-piece 26, the mandrel 22 and bit 24 are axially moved away from the work-piece 28 under the force of the spring 66 and a successive screw 12 is moved through the screw access opening 48 into axial alignment with the shaft 20.

Preferably, the locating portions 62a, 62b, 62c are spaced along the shaft 20 such that at least one locating portion 62c is located in the rearward portion 40 of the guide tube 26 when the mandrel 22 and the bit 24 are fully moved towards the work-piece 28.

In addition to adapting the screw driver for use with screws having differing sized screw heads, the guide tube may similarly be replaced by another having a forward end better configured for screws of varying lengths, as for example by varying the length of the forward portion 46 and the placement of screw access opening 48 and exit opening 50.

While the preferred embodiment of the invention shows a slide body 52 having a cylindrical bore 54 of a uniform radial dimension, the invention is not so limited. Bores of varying in radial dimension, together with complimentary sized guide tubes and screwdriving bits may also be used.

Although the preferred embodiment discloses the retention of the guide tube 26 in the bore 54 with a set screw 53, other means of releasably securing the guide tube in the slide body, including keys and keyway slots, locking pins, screws and sliding shoulders, may also be used.

Similarly it is to be appreciated that other means of preventing the rotation of the guide tube 26 relative to the slide body 52 may equally be used, including the provision of guide tubes having a polygonal shaped exterior surface, for fitted engagement with a complementary shaped bore.

The provision of the guide tube 26 to be removable is advantageous to extend the life of a screwdriver. As the guide tube 26, is a portion which may undergo substantial wear in use, providing the guide tube 26 to be replaced separately from the remainder of the screwdriver may extend the life of the tool. Moreover, Since guide tube 26 is replaceable, it may preferably be made from more wear resistant material such as metal and nylon which permits the slide body 52 to be made from less wear resistant material such as plastic.

The present invention is particularly adapted for use with screws having heads with diameters in the range of about ¼ of an inch and less. The present invention for example permits one screwdriver to be provided with different guideways and drives means so as to drive for example, screws of different size i.e. numbers 8, 10 and 12, and/or lengths i.e. 1 inch, 1.5 inches, 2 inches, etc.

While the invention has been described with reference to preferred embodiments, it is not so limited. Many variations and modifications will now occur to persons skilled in the art. For a definition of the invention, reference is made to the appended claims.

I claim:

1. A screwdriver assembly to drive screws collated together in a strip spaced in parallel relation from each other, the screwdriver comprising:

body means, guide tube means removably fixedly secured to the body means, the guide tube means adapted to receive first correspondingly sized screws having a head with a first diameter, the guide tube means having a cylindrical guideway therethrough of an inner diameter marginally greater than the first diameter, the guide tube means having a substantially cylindrical sidewall about the guideway bordering on the guideway, elongate driver shaft means having at a forward end bit means and including a cylindrical locating section, the shaft means complimentarily sized to the guide tube means by having a diameter of the cylindrical locating section approximately equal the first diameter, the shaft means co-axially disposed within the guideway for relative rotation therein and for axial reciprocal sliding relative to the guideway, the sidewall having a rear shaft guiding portion and a forward screw locating portion, in the rear portion, the sidewall encircling the locating section of the shaft means 360° to coaxially locate the shaft means within the guideway, in the forward portion, the sidewall opening radially into a screw access opening having a radial extent of not less than about 180°, the forward Portion of the sidewall having an engagement section, wherein the sidewall extends about 180° about the shaft means and sufficiently engages the head of the screw to coaxially locate the head of the screw within the guideway, screw feed means to successively, incrementally advance screws collated in a strip spaced in parallel relation from each other through the screw access opening radially into the guideway wherein the sidewall engages the head of the correspondingly sized screw to axially locate the head of the screw coaxially within the guideway in axial alignment with the bit means, the shaft means reciprocally movable axially throughout the length of the guideway to engage the screw and drive it axially from the guideway into a work-piece, the complimentarily sized guide tube means and shaft means being removable for replacement with other complimentarily sized guide tube means and shaft means adapted for engaging and driving in the same manner correspondingly sized screws of a second diameter different than the first diameter.

2. A screwdriver as claimed in claim 1, wherein in a forward-most section of the forward portion, the guideway opens on a side thereof opposite the screw access opening, into a screw-strip exit opening having a radial extent sufficient to permit the strip from which screws have been driven to exit the guideway.

3. A screwdriver as claimed in claim 1, wherein the guide tube means comprises a cylindrical tube having an outer tube diameter.

4. A screwdriver as claimed in claim 1, wherein the forward portion includes, forward of the engagement section, a forward-most section where the guideway opens on a side thereof opposite the screw access opening, into a screws-strip exit opening having a radial extent sufficient to permit the strip from which screws have been driven to exit the guideway.

5. A screwdriver as claimed in claim 3, wherein the body means includes a cylindrical bore of a diameter substantially equal to the outer tube diameter of the cylindrical tube, and means to releasably secure the tube in the bore, whereby the tube is removable for replacement by another cylindrical tube having the same outer tube diameter but a different inner diameter.

6. A screwdriver as claimed in claim 1, wherein the shaft means comprises an elongate mandrel with the bit means removably secured to the forward end.

7. A screwdriver as claimed in claim 6, wherein the locating section of the shaft means is provided on the removable bit.

8. A screwdriver as claimed in claim 6, wherein the locating section of the shaft means comprises a cylindrical section of the mandrel.

9. A screwdriver as claimed in claim 7, wherein the locating section of the shaft means comprises a cylindrical section of the removable bit.

10. A screwdriver as claimed in claim 1, wherein said guide tube means is formed from metal.

11. A screwdriver as claimed in claim 10, wherein said body means comprises plastic material.

12. A screwdriver as claimed in claim 11, wherein the shaft means comprises an elongate mandrel with the bit means removably secured to the forward end.

13. A screwdriver as claimed in claim 12, wherein the locating section of the shaft means is provided on the removable bit.

14. A screwdriver as claimed in claim 12, wherein the locating section of the shaft means comprises a cylindrical section of the mandrel.

15. A screwdriver as claimed in claim 13, wherein the locating section of the shaft means comprises a cylindrical section of the removable bit.

* * * * *